US011063457B2

(12) United States Patent
Melman

(10) Patent No.: US 11,063,457 B2
(45) Date of Patent: Jul. 13, 2021

(54) AUTOMATIC SHUTDOWN DEVICE FOR BATTERY-POWERED ELECTRONICS

(71) Applicant: Emanuel Melman, Boca Raton, FL (US)

(72) Inventor: Emanuel Melman, Boca Raton, FL (US)

(*) Notice: Subject to any disclaimer, the term of this patent is extended or adjusted under 35 U.S.C. 154(b) by 0 days.

(21) Appl. No.: 16/821,030

(22) Filed: Mar. 17, 2020

(65) Prior Publication Data
US 2020/0303937 A1    Sep. 24, 2020

Related U.S. Application Data

(60) Provisional application No. 62/821,683, filed on Mar. 21, 2019.

(51) Int. Cl.
H02J 7/00       (2006.01)
B60R 25/40      (2013.01)

(52) U.S. Cl.
CPC .......... H02J 7/0063 (2013.01); B60R 25/406 (2013.01)

(58) Field of Classification Search
CPC ....... H02J 7/0063; B60R 25/406; B60R 25/24
See application file for complete search history.

(56) References Cited

U.S. PATENT DOCUMENTS

| 5,245,269 | A  | 9/1993 | Tooley et al. |
| 7,274,118 | B2 | 9/2007 | Jenson et al. |
| 8,431,263 | B2 | 4/2013 | Schuster      |
| 2002/0199131 | A1 | 12/2002 | Kocin |
| 2006/0220806 | A1* | 10/2006 | Nguyen ............... B60R 25/102 340/426.36 |
| 2008/0008418 | A1 | 1/2008 | Smith et al. |
| 2008/0142352 | A1 | 6/2008 | Wright |

(Continued)

FOREIGN PATENT DOCUMENTS

| EM | 4539302-0001 | 7/2017 |
| EM | 4539302-0002 | 7/2017 |

(Continued)

OTHER PUBLICATIONS

Search Report issued by the Patent Office of the Republic of Poland regarding Polish Patent Application No. PL127799 dated Mar. 26, 2019, 13 pages.

(Continued)

*Primary Examiner* — James J Yang
(74) *Attorney, Agent, or Firm* — Haynes and Boone, LLP

(57) ABSTRACT

Apparatus, methods, and systems according to which shutdown features are provided to battery-powered electronics. An automatic shutdown device detects periods in which the battery-powered electronics are motionless using a sensor and, based on such detection, disconnects the battery from the battery-powered electronics using an electronic switch, rendering the battery-powered electronics inoperable. In addition, the automatic shutdown device is able to reenergize the battery-powered electronics using the electronic switch once motion is detected by the sensor so that the battery-powered electronics can resume normal operations. In several embodiments, the battery-powered electronics include a keyless fob associated with a vehicle and the automatic shutdown device is part of a vehicle theft prevention system.

23 Claims, 9 Drawing Sheets

(56) References Cited

U.S. PATENT DOCUMENTS

2016/0020443 A1* 1/2016 White ................. H01M 50/209
                                                    318/245
2017/0202609 A1    7/2017 Shelton, IV et al.

FOREIGN PATENT DOCUMENTS

EM    4539302-0003    7/2017
PL         127799     6/2019

OTHER PUBLICATIONS

Invitation to Pay Additional Fees issued by the United States International Search Authority regarding International Application No. PCT/US2020/023104 dated May 7, 2020, 2 pages.
International Search Report and Written Opinion issued by the United States International Search Authority regarding International Application No. PCT/US2020/023104 dated Jul. 20, 2020, 20 pages.

* cited by examiner

AUTOMATIC SHUTDOWN DEVICE FOR BATTERY-POWERED ELECTRONICS

CROSS-REFERENCE TO RELATED APPLICATION

This application claims the benefit of the filing date of, and priority to, U.S. Application No. 62/821,683, filed Mar. 21, 2019, the entire disclosure of which is hereby incorporated herein by reference.

TECHNICAL FIELD

The present application relates generally to battery-powered electronics and, more particularly, to an automatic shutdown device for battery-powered electronics, which automatic shutdown device can be used to prevent theft of vehicles equipped with keyless starting technologies.

BACKGROUND

A motor vehicle can be equipped with a mechanical lock to prevent unauthorized use of the vehicle by requiring a mechanical key to be inserted into the mechanical lock and rotated to switch on the vehicle's electrical circuits and to facilitate starting and running of the vehicle's engine. Theft of such vehicles may occur through unauthorized duplication of the mechanical key or by breaking the mechanical lock. In addition, or instead, the motor vehicle can be equipped with one or more electronic locks to prevent unauthorized entry and/or use of the vehicle. The electronic lock(s) rely on digital encryption and radio frequency communications between an electronic key (e.g., a keyless fob) and one or more electronic control units in the vehicle.

Some vehicles are equipped with fully keyless entry and start systems that allow a user in possession of a keyless fob (i.e., the electronic key) to enter and start the vehicle without handling the keyless fob at all. More particularly, to enter the vehicle, the keyless fob can be carried in a pocket, purse, or bag while the user touches a door handle of the vehicles and/or presses a button on the vehicle to unlock a door of the vehicle. Once the keyless fob is positioned inside the vehicle, the user can press a start button in the vehicle to start the vehicle. During operation, all authentication between the keyless fob and the electronic control unit(s) takes place wirelessly in the background so as to be transparent to the user.

Such fully keyless entry and start systems are typically designed to be short range (e.g., maximum range of ~15 feet). However, an unauthorized user can increase the range of such fully keyless entry and start systems far beyond design limits using custom-engineered radio frequency boosters, repeaters, high gain antennas, and/or other electronic devices. Since the keyless fob is always powered, the unauthorized user is able to enter, start, and drive the vehicle away without possessing the keyless fob (e.g., with the keyless fob in a nearby residence). Therefore, what is needed is an apparatus, system, and/or method that addresses one or more of the foregoing issues and/or one or more other issues.

DETAILED DESCRIPTION

Many vehicle thefts occur at night with the vehicle parked within the vicinity of a dwelling or structure in which the vehicle's keyless fob is stowed. The keyless fob is motionless during most the time when the vehicle is parked, e.g., placed in a certain spot within the dwelling or structure and/or remaining in a purse or bag. The present disclosure introduces a vehicle theft prevention system including an automatic shutdown device adapted to detect periods in which the keyless fob is motionless and, based on such detection, disconnect an internal battery of the keyless fob from the keyless fob's electronic circuitry, rendering the keyless fob inoperable. During this condition, any attempt to authorize the keyless fob would be unsuccessful and, as a result, any attempt to break into or steal the vehicle by trying to increase the range of the keyless fob would fail. The automatic shutdown device is further adapted to allow reenergization of the keyless fob by the internal battery once motion is detected, so that the keyless fob can resume normal operations. Although described herein as being associated with a keyless fob to form part of a vehicle theft prevention system, the automatic shutdown device may instead be associated with other battery-powered electronics to provide shutdown features to such battery-powered electronics, as will be described in further detail below.

Figure 1:
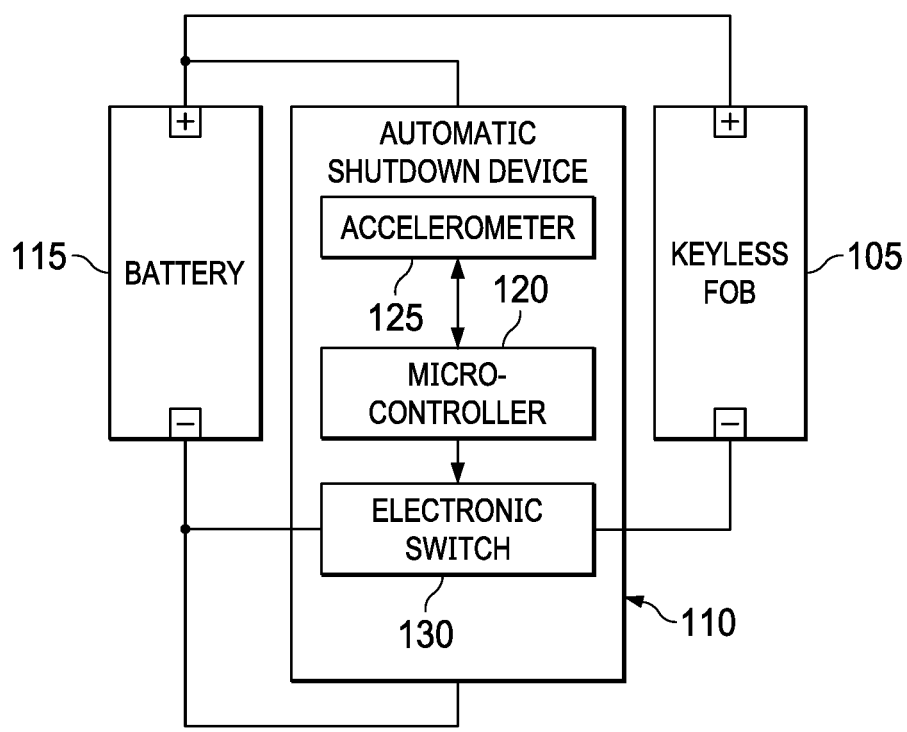
FIG. 1 is a diagrammatic illustration of a vehicle theft prevention system including a keyless fob, an automatic shutdown device, and a battery, according to one or more embodiments.

Referring to FIG. 1, in an embodiment, a vehicle theft prevention system is diagrammatically illustrated and generally referred to by the reference numeral 100. The vehicle theft prevention system 100 includes an electronic device 105 (e.g., a keyless fob), an electronic device 110 (e.g., an automatic shutdown device), and a battery 115. The electronic device 110 includes a microcontroller 120, a sensor such as, for example, an accelerometer 125, and an electronic switch 130. In several embodiments, the vehicle theft prevention system 100 may include a sensor other than the accelerometer 125. For example, the vehicle theft prevention system 100 may include a gyroscope. For another example, the vehicle theft prevention system 100 may include another type of motion sensor/detector. The microcontroller 120 is electrically coupled to the battery 115, the accelerometer 125, and the electronic switch 130. The electronic switch 130 is also electrically coupled to the battery 115 and the electronic device 105. The accelerometer 125 is physically associated with, and adapted to detect, a physical state (e.g., in motion or motionless) of the electronic device 105. Based on such detection, the accelerometer 125 is adapted to send one or more electrical signals (e.g., sensor signals) to the microcontroller 120. The microcontroller 120 is adapted to receive the electrical signal(s) sent from the accelerometer 125. Based on such received electrical signal(s), the microcontroller 120 is adapted to send one or more electrical signals (e.g., control signals) to the electronic switch 130. The electronic switch 130 is adapted to receive the electrical signal(s) sent from the microcontroller 120. Based on such received electrical signal(s), the electronic switch 130 is adapted to be actuated to, or remain in, an "on" configuration or an "off" configuration, as will be described in more detail below.

In operation, the electronic device 110 is able to detect periods in which the electronic device 105 is motionless using the accelerometer 125 and, based on such detection, disconnect the battery 115 from the electronic device 105 using the electronic switch 130, rendering the electronic device 105 inoperable. In addition, the electronic device 110 is able to reenergize the electronic device 105 using the electronic switch 130 once motion is detected by the accelerometer 125 so that the electronic device 105 can resume normal operations. More particularly, during operation, the accelerometer 125 receives electrical power from the battery 115 via the microcontroller 120, detects a physical state of the electronic device 105 (e.g., in motion or motionless), and, based on such detection, sends one or more electrical signals to the microcontroller 120. The microcontroller 120 receives electrical power from the battery 115, receives the electrical signal(s) sent from the accelerometer 125, and, based on the electrical signal(s) received from the accelerometer 125, sends one or more electrical signals to the electronic switch 130. The electronic switch 130 receives electrical power from the battery 115, receives the electrical signal(s) sent from the microcontroller 120, and, based on the electrical signal(s) received from the microcontroller 120, is actuated to, or remains in, an "on" configuration or an "off" configuration. In the "on" configuration, electrical power is supplied from the battery 115 to the electronic device 105 via the electronic switch 130. Conversely, in the "off" configuration, the electronic switch 130 prevents electrical power from being supplied from the battery 115 to the electronic device 105.

Figure 2A:
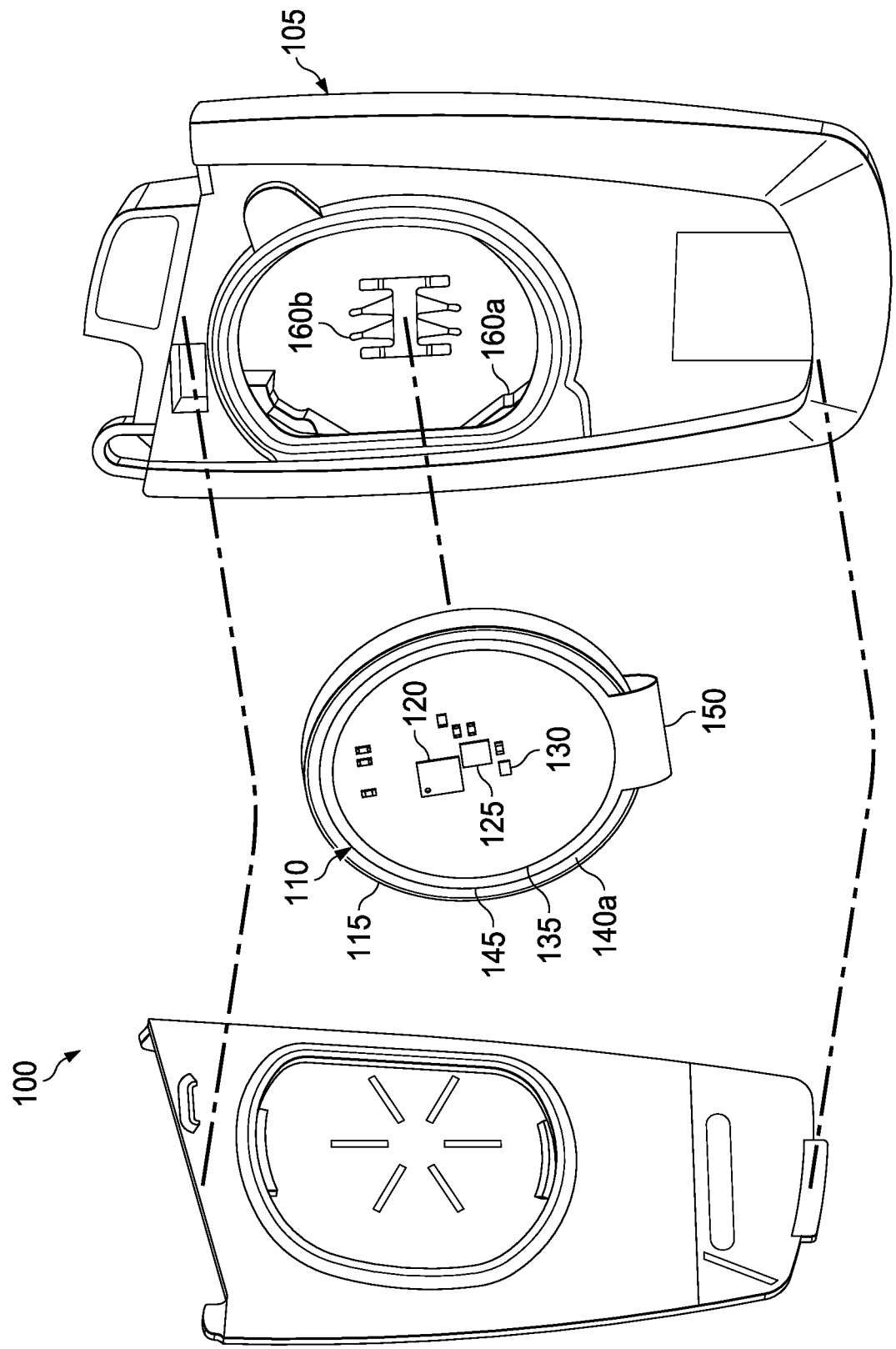
FIG. 2A is a perspective view of the vehicle theft prevention system of FIG. 1 in a disassembled state, the keyless fob being shown in an open state, and the automatic shutdown device being shown wrapped around the battery (so that a first contact pad of the automatic shutdown device is visible) but not installed into the keyless fob, according to one or more embodiments.
Figure 2B:
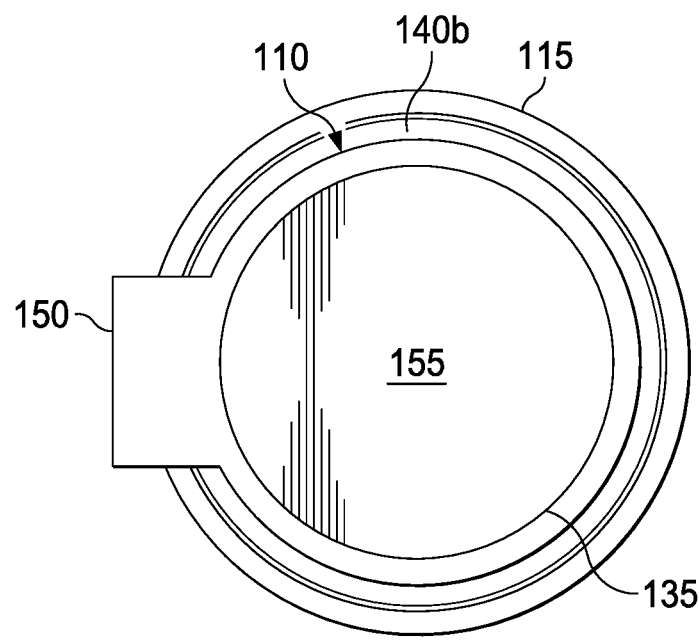
FIG. 2B is a bottom view of the automatic shutdown device with a second contact pad of the automatic shutdown device being visible, according to one or more embodiments.
Figure 2C:
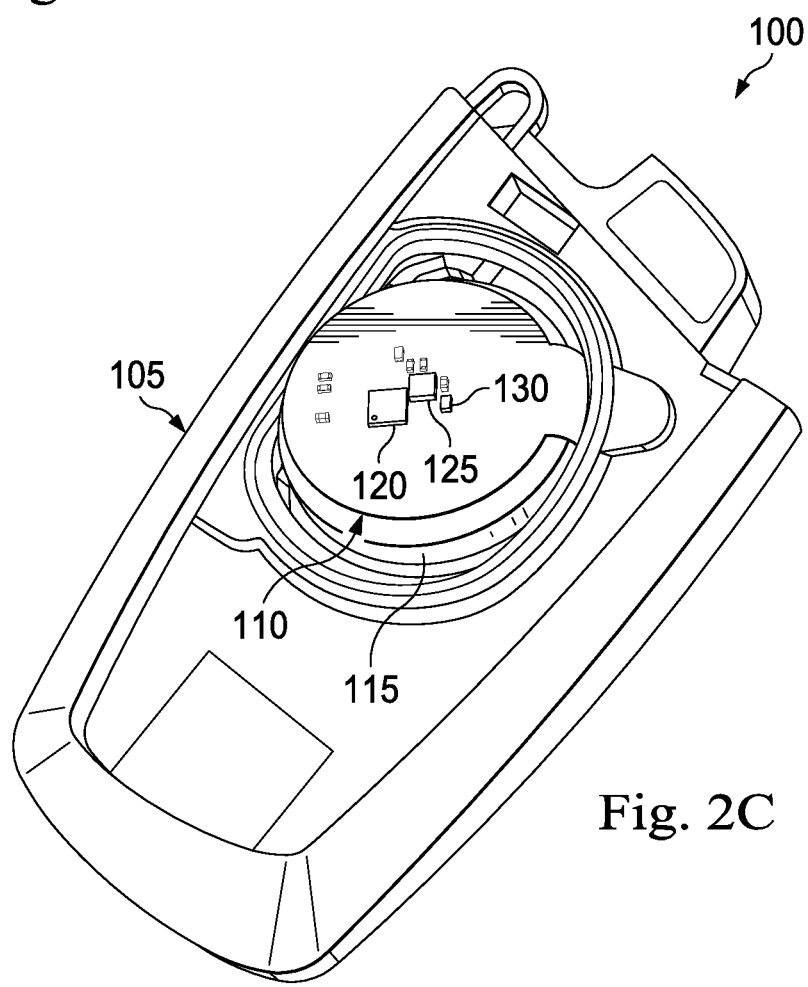
FIG. 2C is a perspective view of the vehicle theft prevention system of FIG. 1 in a partially assembled state, the keyless fob being shown in an open state, and the automatic shutdown device being shown wrapped around the battery and installed into the keyless fob, according to one or more embodiments.

Referring to FIGS. 2A-2C, with continuing reference to FIG. 1, in an embodiment, the electronic device 110 includes a flexible circuit board 135 to which the microcontroller 120, the accelerometer 125, and the electronic switch 130 are physically coupled. The flexible circuit board 135 includes printed circuitry to which the microcontroller 120, the accelerometer 125, and the electronic switch 130, among other components, are electrically coupled. The battery 115 can be a coin cell battery around which the flexible circuit board 135 wraps to contact both a positive terminal 140a (shown in FIG. 2A) and a negative terminal 140b (shown in FIG. 2B) of the battery 115. As shown in FIG. 2A, the flexible circuit board 135 includes a contact pad 145 that physically contacts the positive terminal 140a of the battery 115. In several embodiments, as in FIG. 2A, the microcontroller 120, the accelerometer 125, and the electronic switch 130 are physically coupled to the contact pad 145. A flexible ribbon 150 is also physically coupled to the contact pad 145. As shown in FIG. 2B, the flexible circuit board 135 also includes a contact pad 155 that physically contacts the negative terminal 140b of the battery 115. In addition to being physically coupled to the contact pad 145, the flexible ribbon 150 is physically coupled to the contact pad 155. As a result, the flexible ribbon 150 enables the flexible circuit board 135 to wrap around (or "sandwich") the battery 115 such that the contact pad 145 physically contacts the positive terminal 140a of the battery 115 and the contact pad 155 physically contacts the negative terminal 140b of the battery 115. At least a portion of the flexible ribbon 150 can conduct electricity between the contact pads 145 and 155. As shown in FIGS. 2A and 2B, the electronic device 105 includes a positive terminal 160a and a negative terminal 160b. Turning to FIG. 2C, the battery 115 and the electronic device 110, in combination, are shown installed in the electronic device 105.

Figure 3A:
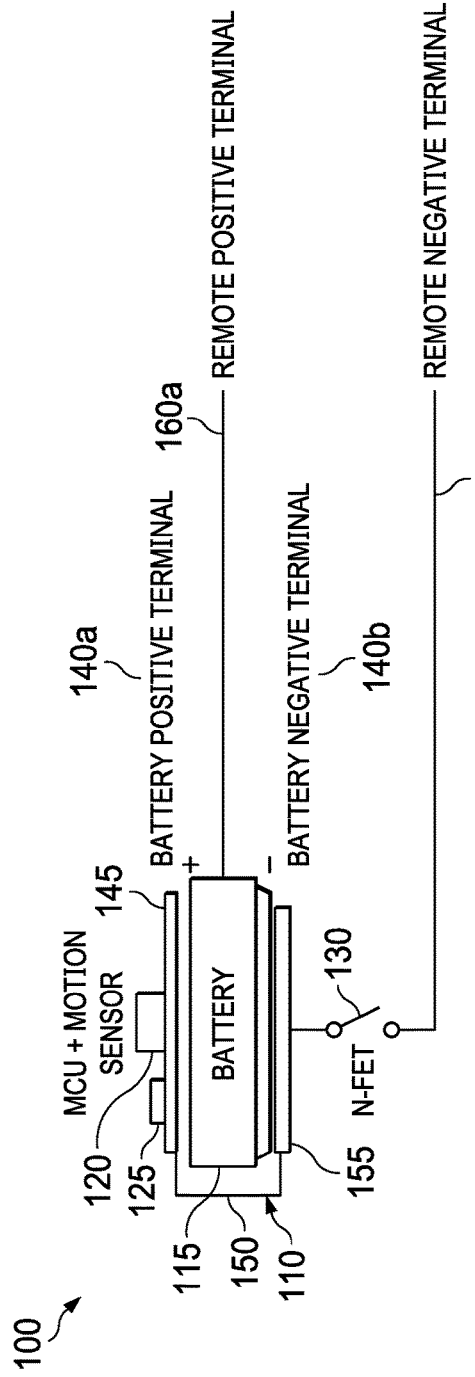
FIG. 3A is a diagrammatic illustration of the automatic shutdown device and the battery of FIGS. 1 and 2A-2C, according to one or more embodiments.

Referring to FIG. 3A, with continuing reference to FIGS. 2A-2C, in an embodiment, when the battery 115 and the electronic device 110, in combination, are installed in the electronic device 105: the positive terminal 140a of the battery 115 physically contacts both the contact pad 145 of the electronic device 110 and the positive terminal 160a of the electronic device 105; the negative terminal 140b of the battery 115 physically contacts the contact pad 155 of the electronic device 110; and the negative terminal 160b of the electronic device 105 physically contacts the contact pad 155 of the electronic device 110, opposite the negative terminal 140b of the electronic device 110. In several embodiments, as in FIG. 3A, when the electronic switch 130 is in the "on" configuration, electrical power is allowed to be communicated via the contact pad 155 between the negative terminal 140b of the battery 115 and the negative terminal 160b of the electronic device 105. Conversely, when the electronic switch 130 is in the "off" configuration, communication of electrical power via the contact pad 155 between the negative terminal 140b of the battery 115 and the negative terminal 160b of the electronic device 105 is prevented, or at least reduced.

Figure 3B:
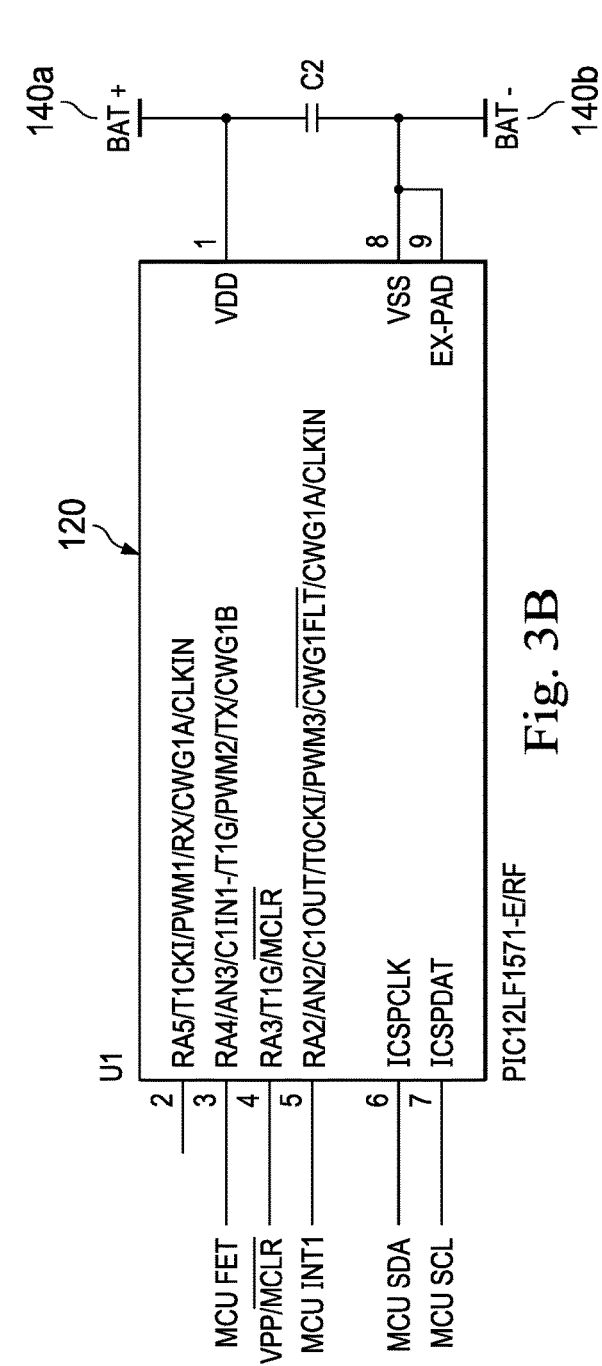
FIG. 3B illustrates a part of a circuit diagram including a microcontroller of the automatic shutdown device of FIGS. 1 and 2A-2C, according to one or more embodiments.
Figure 3C:
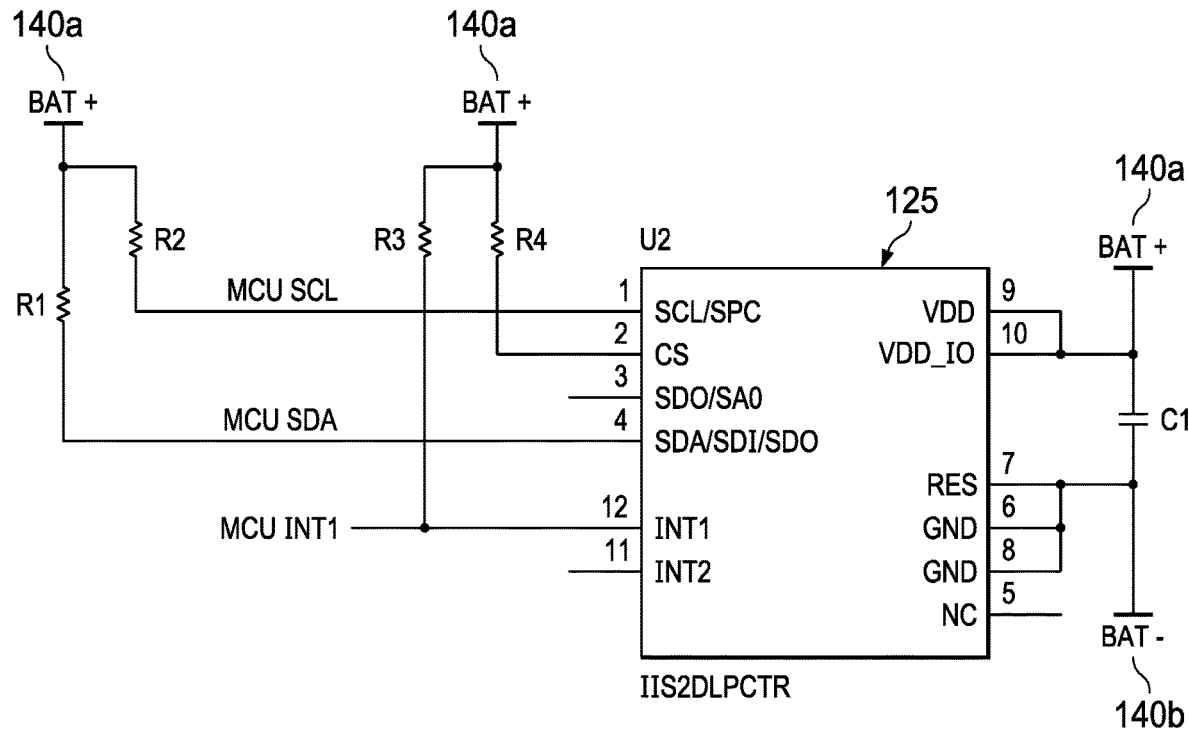
FIG. 3C illustrates a part of a circuit diagram including an accelerometer of the automatic shutdown device of FIGS. 1 and 2A-2C, according to one or more embodiments.
Figure 3D:
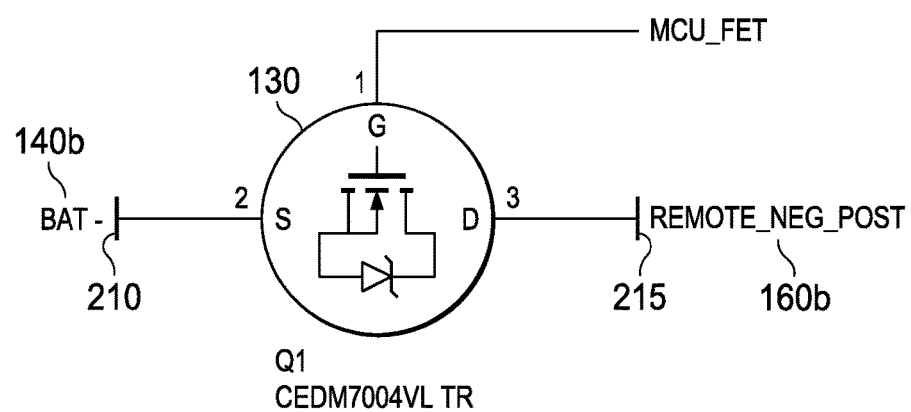
FIG. 3D illustrates a part of a circuit diagram including an electronic switch of the automatic shutdown device of FIGS. 1 and 2A-2C, according to one or more embodiments.
Figure 3E:
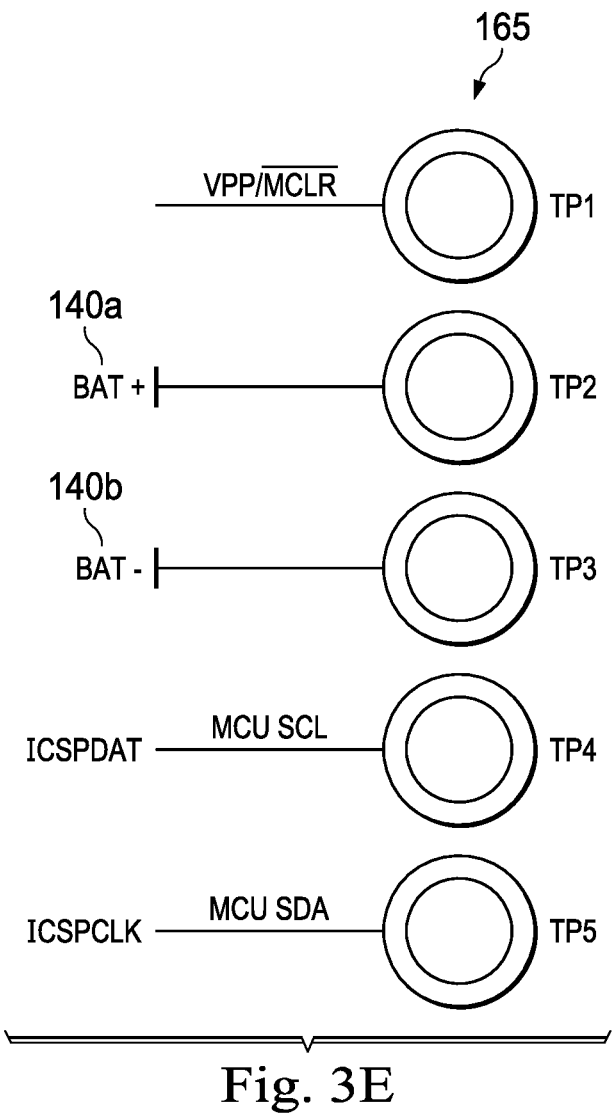
FIG. 3E illustrates a part of a circuit diagram including a prog port of the automatic shutdown device of FIGS. 1 and 2A-2C, according to one or more embodiments.
Figure 3F:
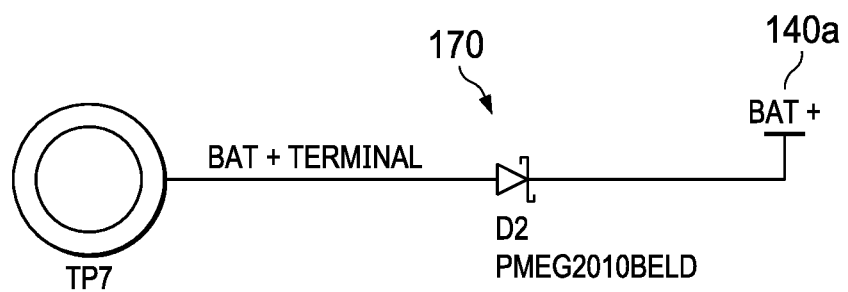
FIG. 3F illustrates a part of a circuit diagram including a reverse polarity protection device of the automatic shutdown device of FIGS. 1 and 2A-2C, according to one or more embodiments.

Referring to FIGS. 3B-3F, with continuing reference to FIG. 3A, a circuit diagram of an embodiment of the electronic device 110 is illustrated. As shown in FIG. 3B, a part of the circuit diagram of the electronic device 110 including an embodiment of the microcontroller 120 is illustrated. As shown in FIG. 3C, a part of the circuit diagram of the electronic device 110 including an embodiment of the accelerometer 125 is illustrated. As shown in FIG. 3D, a part of the circuit diagram of the electronic device 110 including an embodiment of the electronic switch 130 is illustrated. As shown in FIG. 3E, a part of the circuit diagram of the electronic device 110 including an embodiment of a prog port 165 is illustrated. As shown in FIG. 3F, a part of the circuit diagram of the electronic device 110 including an embodiment of a reverse polarity protection device 170 is illustrated.

Although described herein as being associated with the electronic device 105 to form part of the vehicle theft prevention system 100, the electronic device 105 may be omitted and the electronic device 110 may instead be associated with another battery-powered electronic device to provide shutdown features to such battery-powered electronic device; in several embodiments, if the electronic device 105 is omitted in favor of another battery-powered electronic device, the system 100 may no longer be a vehicle theft prevention system but instead is another type of system. In addition, although described herein as including the accelerometer 125, the accelerometer 125 may be omitted and the electronic device 110 may instead include another sensor electrically coupled to the microcontroller 120 and capable of detecting another condition (e.g., speed, location, orientation, temperature, pressure, altitude, etc.); in such embodiments, the microcontroller 120 is configured to actuate the electronic switch 130 between the "on" configuration and the "off" configuration based on electrical signals received from such sensor.

Figure 4A:
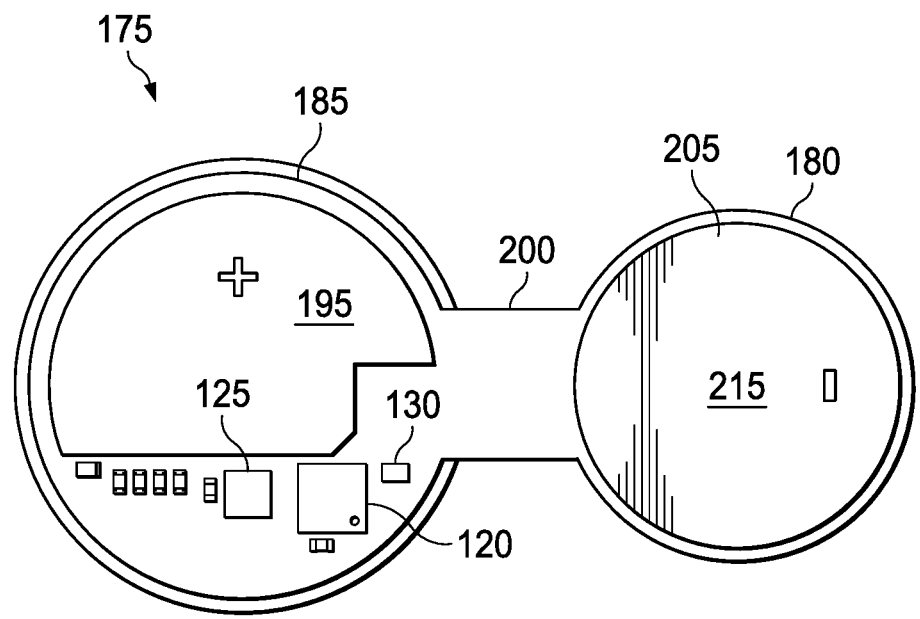
FIG. 4A is a top plan view of another automatic shutdown device, according to one or more embodiments.
Figure 4B:
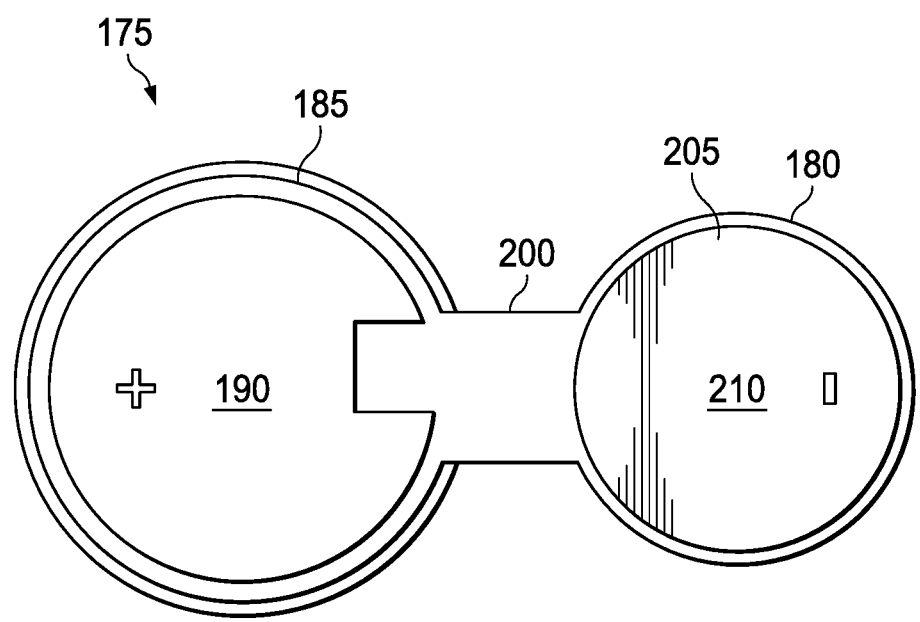
FIG. 4B is a bottom plan view of the automatic shutdown device of FIG. 4A, according to one or more embodiments.
Figure 4C:
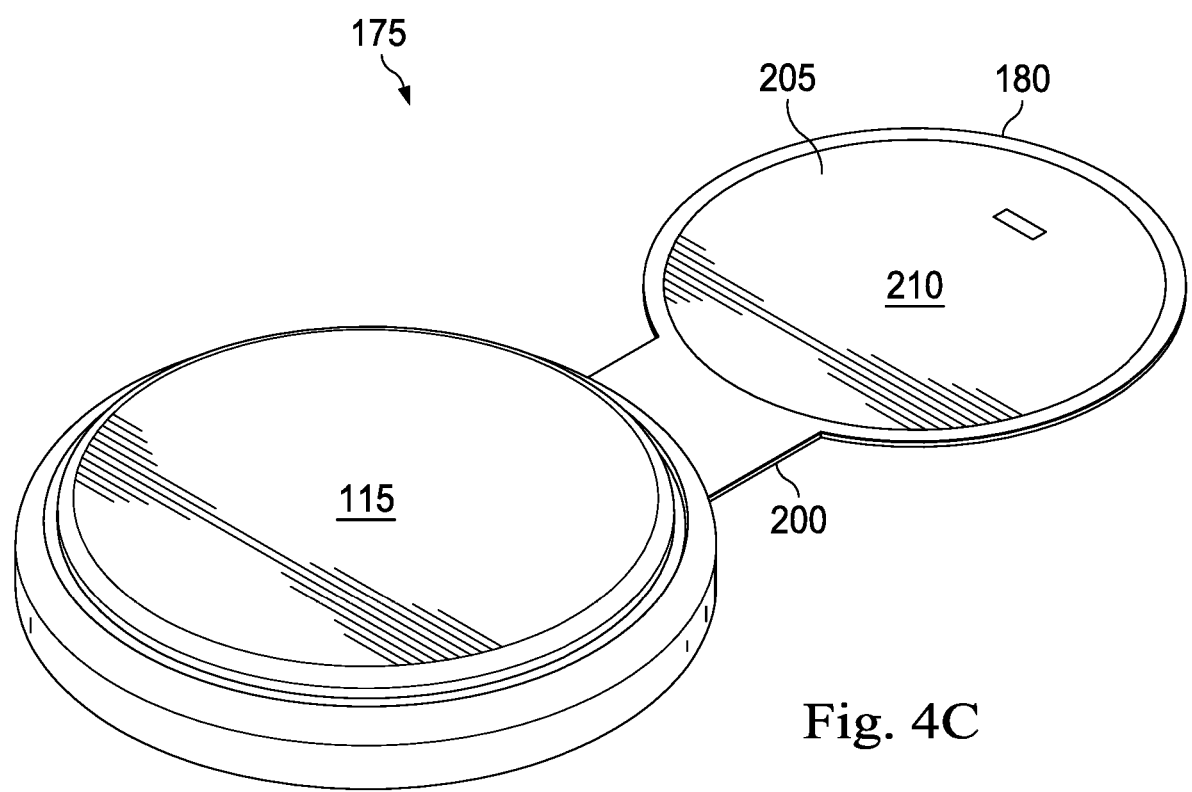
FIG. 4C is a perspective view of the automatic shutdown device of FIGS. 4A and 4B contacting a battery, according to one or more embodiments.

Referring to FIGS. 4A-4C, with continuing reference to FIGS. 1, 2A-2C, and 3A-3F, in an embodiment, an automatic shutdown device is generally referred to by the reference numeral 175. In several embodiments, the electronic device 110 is omitted from the vehicle theft prevention system 100 and replaced with the automatic shutdown device 175. The automatic shutdown device 175 includes several features substantially similar to corresponding features of the electronic device 110, which substantially similar features are given the same reference numerals. As shown in FIGS. 4A and 4B, the automatic shutdown device 175 includes a flexible circuit board 180 to which the microcontroller 120, the accelerometer 125, and the electronic switch 130 are physically coupled. The flexible circuit board 180 includes printed circuitry to which, the microcontroller 120, the accelerometer 125, and the electronic switch 130, among other components, are electrically coupled. As shown in FIG. 4C, the battery 115 can be a coin cell battery around which the flexible circuit board 180 is configured to wrap to contact both the positive terminal 140a and the negative terminal 140b of the battery 115.

As shown in FIGS. 4A and 4B, the flexible circuit board 180 includes a contact pad 185 adapted to physically contact the positive terminal 140a of the battery 115. More particularly, a conductive region 190 (shown in FIG. 4B) of the contact pad 185 is adapted to physically contact the positive terminal 140a of the battery 115, as shown in FIG. 4C. In several embodiments, as in FIG. 4A, the microcontroller 120, the accelerometer 125, and the electronic switch 130 are physically coupled to the contact pad 185 on a side of the contact pad 185 opposite the conductive region 190. The side of the contact pad 185 opposite the conductive region 190 may also include a conductive region 195, which conductive region 195 may be adapted to physically contact a positive terminal of a keyless fob into which the battery 115 and the automatic shutdown device 175, in combination, are installed. The conductive region 190 is internally electrically coupled to the conductive region 195 to provide electrical continuity to the contact pad 185 so that positive battery voltage can pass from the positive terminal 140a of the battery 115 to the positive terminal 160a of the electronic device 105. A flexible ribbon 200 is physically coupled to the contact pad 185.

As shown in FIGS. 4A and 4B, the flexible circuit board 180 also includes a contact pad 205 adapted to physically contact the negative terminal 140b of the battery 115. More particularly, a conductive region 210 (shown in FIG. 4B) of the contact pad 205 is adapted to physically contact the negative terminal 140b of the battery 115, as shown in FIG. 4C. The conductive regions 190 and 210 are together adapted to route electrical power from the battery 115 to the microcontroller 120, the accelerometer 125, and/or the electronic switch 130. The side of the contact pad 205 opposite the conductive region 210 may also include a conductive region 215, which conductive region 215 may be adapted to physically contact a negative terminal of the keyless fob into which the battery 115 and the automatic shutdown device 175, in combination, are installed. At least a portion of the flexible ribbon 200 can conduct electricity between the contact pads 185 and 205. More particularly, the conductive region 215 is electrically coupled to the electronic switch 130 via the flexible ribbon 200. In one or more embodiments, the electronic switch 130 is electrically coupled between the conductive region 210 and the conductive region 215; one embodiment of this electrical coupling is shown in FIG. 3D. In addition to being physically coupled to the contact pad 185, the flexible ribbon 200 is physically coupled to the contact pad 205. As a result, the flexible ribbon 200 enables the flexible circuit board 180 to wrap around (or "sandwich") the battery 115 such that the contact pad 185 physically contacts the positive terminal 140a of the battery 115 (as shown in FIG. 4C) and the contact pad 205 physically contacts the negative terminal 140b of the battery 115. The operation of the automatic shutdown device 175 is substantially similar to the above-described operation of the electronic device 110 and, therefore, will not be described in further detail.

In operation, the microcontroller 120 is constantly powered by the battery 115. The accelerometer 125 constantly monitors the acceleration rate of the electronic device 110. The microcontroller 120 and the accelerometer 125 are in electrical communication with each other. Machine code programmed in the microcontroller 120 is designed to actuate the electronic switch 130 between the "on" configuration and the "off" configuration upon meeting certain acceleration and time criteria. In several embodiments, the accelerometer 125 is capable of detecting and reporting acceleration from $\frac{1}{32}$ G in $\frac{1}{32}$ G intervals. Accordingly, the microcontroller 120 may interpret accelerations below this detection threshold (i.e., below $\frac{1}{32}$ G) as a motionless state, accelerations of $\frac{1}{32}$ G to $\frac{2}{32}$ G as very light motion, and accelerations above $\frac{3}{32}$ G as motion. In several embodiments, by default and at startup, the microcontroller 120 enables the electronic switch 130 to communicate electrical power to the electronic device 105. When a motionless state has been detected and reported by the accelerometer 125, the microcontroller 120 starts a timer. If the motionless state continues for a predetermined period, at the end of the predetermined period the microcontroller 120 enters a shutdown state in which the microcontroller 120 actuates the electronic switch 130 to the "off" configuration and enters a low power sleep mode. As a result, the electronic device 105 is disconnected from the battery 115. Subsequently, upon detecting a threshold acceleration of $\frac{3}{32}$ G, the accelerometer 125 sends a wakeup signal to microcontroller 120. The microcontroller 120 wakes up from the sleep mode to check the signal received from the accelerometer 125 and to further detect and analyze motion accelerations. Upon a correct determination of motion, the microcontroller 120 actuates the electronic switch 130 to the "on" configuration to supply electrical power from the battery 115 to the electronic device 105, thus enabling the electronic device 105 to operate normally.

Although described herein as being associated with the electronic device 105 to form part of the vehicle theft prevention system 100, the electronic device 105 may be omitted and the automatic shutdown device 175 may instead be associated with another battery-powered electronic device to provide shutdown features to such battery-powered electronic device; in several embodiments, if the electronic device 105 is omitted in favor of another battery-powered electronic device, the system 100 may no longer be a vehicle theft prevention system but instead is another type of system. In addition, although described herein as including the accelerometer 125, the accelerometer 125 may be omitted and the automatic shutdown device 175 may instead include another sensor electrically coupled to the microcontroller 120 and capable of detecting another condition (e.g., speed, location, orientation, temperature, pressure, altitude, etc.); in such embodiments, the microcontroller 120 is configured to actuate the electronic switch 130 between the "on" configuration and the "off" configuration based on electrical signals received from such sensor.

Figure 5:
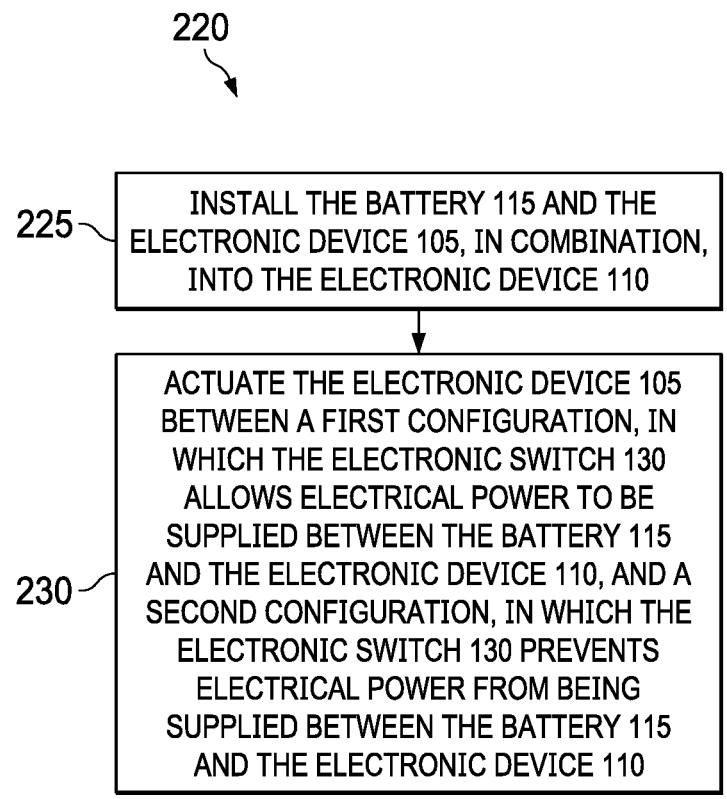
FIG. 5 is a flow diagram of a method for implementing one or more embodiments of the present disclosure.

Referring to FIG. 5, with continuing reference to FIGS. 1, 2A-2C, 3A-3F, and 4A-4C, in an embodiment, a method of operating the vehicle theft prevention system 100 is generally referred to by the reference numeral 220. The method 220 includes, at a step 225, installing the battery 115 and the electronic device 105 (e.g., the keyless fob), in combination, into the electronic device 110 (e.g., the automatic shutdown device). As discussed herein, the electronic device 105 includes: the sensor (e.g., the accelerometer 125); the electronic switch 130; and the microcontroller 120 electrically coupled to the sensor and the electronic switch 130. In several embodiments, executing the step 225 electrically couples: the microcontroller 120 to the battery 115; and the electronic switch 130 between the battery 115 and the electronic device 110. In several embodiments, executing the step 225 includes: wrapping a flexible circuit board (e.g., 135 or 180) to which the microcontroller 120, the sensor, and the electronic switch 130 are physically coupled around the battery 115 to contact both a positive terminal and a negative terminal of the battery 115. As discussed herein, the flexible circuit board includes: a first contact pad; a second contact pad; and a flexible ribbon physically coupled between the first contact pad and the second contact pad. In several embodiments, executing the step 225 further includes: physically contacting the positive terminal of the battery 115 with a first conductive region of the first contact pad. In several embodiments, executing the step 225 further includes: physically contacting a positive terminal of the electronic device 110 with a second conductive region of the first contact pad. In several embodiments, executing the step 225 further includes: physically contacting the negative terminal of the battery 115 with a second conductive region of the second contact pad. In several embodiments, executing the step 225 further includes: physically contacting a negative terminal of the electronic device 110 with a third conductive region of the second contact pad. In several embodiments, the electronic switch 130 is electrically coupled between the second conductive region and the third conductive region.

At a step 230, the electronic device 105 is actuated between: a first configuration, in which the electronic switch 130 allows electrical power to be supplied between the battery 115 and the electronic device 110; and a second configuration, in which the electronic switch 130 prevents electrical power from being supplied between the battery 115 and the electronic device 110. In several embodiments, executing the step 230 includes: detecting, using the sensor, a physical state of the electronic device 110; and based on the detected physical state of the electronic device 110, sending, using the sensor, one or more first electrical signals to the microcontroller 120. In several embodiments, executing the step 230 further includes: receiving, using the microcontroller 120, the one or more first electrical signals sent from the sensor; and based on such received one or more first electrical signals, sending, using the microcontroller 120, one or more second electrical signals to the electronic switch 130. In several embodiments, executing the step 230 further includes: receiving, using the electronic switch 130, the one or more second electrical signals sent from the microcontroller 120; and based on such received one or more second electrical signals, actuating the electronic device 105 between the first configuration and the second configuration.

Figure 6:
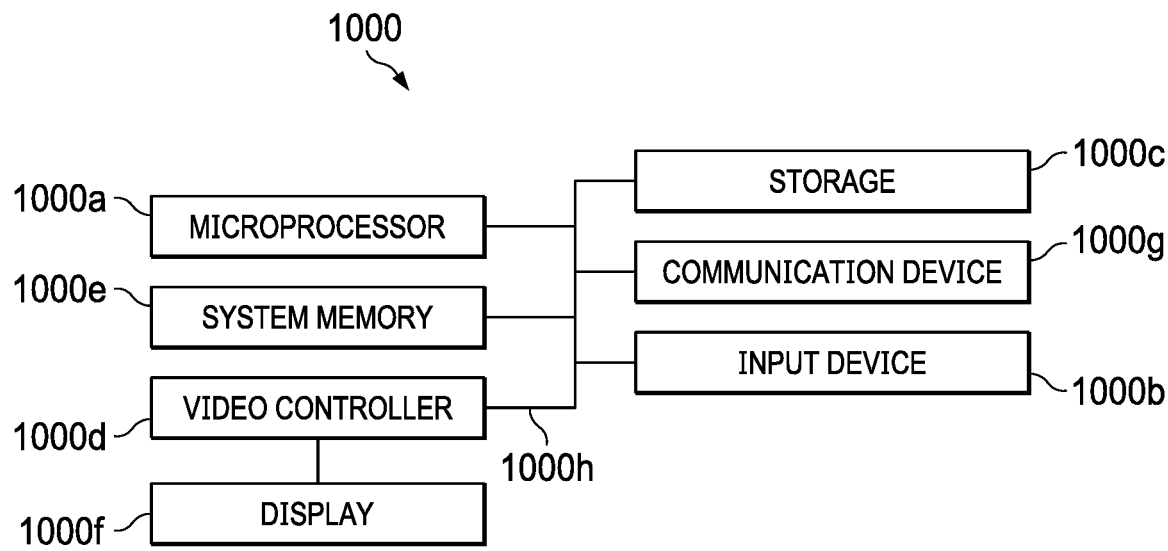
FIG. 6 is a diagrammatic illustration of a computing node for implementing one or more embodiments of the present disclosure.

Referring to FIG. 6, with continuing reference to FIGS. 1, 2A-2C, 3A-3F, 4A-4C, and 5, in an embodiment, a computing node 1000 for implementing one or more embodiments of one or more of the above-described elements, systems (e.g., the theft prevention system 100), apparatus (e.g., the automatic shutdown devices 110 and 175), microcontrollers (e.g., the microcontroller 120), methods (e.g., the method 220), and/or steps (e.g., the steps 225 and/or 230), or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several embodiments, the microprocessor 1000a is, includes, or is part of, the microcontroller 120. In several embodiments, the storage device 1000c may include a floppy drive, hard drive, CD-ROM, optical drive, any other form of storage device or any combination thereof. In several embodiments, the storage device 1000c may include, and/or be capable of receiving, a floppy disk, CD-ROM, DVD-ROM, or any other form of computer-readable medium that may contain executable instructions. In several embodiments, the communication device 1000g may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a non-transitory computer readable medium may be executed by one or more processors to cause the one or more processors to carry out or implement in whole or in part the above-described operation of each of the above-described elements, systems (e.g., the theft prevention system 100), apparatus (e.g., the automatic shutdown devices 110 and 175), microcontrollers (e.g., the microcontroller 120), methods (e.g., the method 220), and/or steps (e.g., the steps 225 and/or 230), or any combination thereof. In several embodiments, such a processor may include one or more of the microprocessor 1000*a*, the microcontroller 120, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A method has been disclosed according to one or more embodiments of the present disclosure. The method generally includes: installing a battery and a first electronic device, in combination, into a second electronic device, wherein the first electronic device includes: a sensor; an electronic switch; and a microcontroller electrically coupled to the sensor and the electronic switch; and wherein installing the battery and the first electronic device, in combination, into the second electronic device electrically couples: the microcontroller to the battery; and the electronic switch between the battery and the second electronic device; actuating the first electronic device between: a first configuration, in which the electronic switch allows electrical power to be supplied between the battery and the second electronic device; and a second configuration, in which the electronic switch prevents electrical power from being supplied between the battery and the second electronic device. In several embodiments, actuating the first electronic device between the first configuration and the second configuration includes: detecting, using the sensor, a physical state of the second electronic device; and based on the detected physical state of the second electronic device, sending, using the sensor, one or more first electrical signals to the microcontroller. In several embodiments, actuating the first electronic device between the first configuration and the second configuration further includes: receiving, using the microcontroller, the one or more first electrical signals sent from the sensor; and based on such received one or more first electrical signals, sending, using the microcontroller, one or more second electrical signals to the electronic switch. In several embodiments, actuating the first electronic device between the first configuration and the second configuration further includes: receiving, using the electronic switch, the one or more second electrical signals sent from the microcontroller; and based on such received one or more second electrical signals, actuating the first electronic device between the first configuration and the second configuration. In several embodiments, installing the battery and the first electronic device, in combination, into the second electronic device includes: wrapping a flexible circuit board to which the microcontroller, the sensor, and the electronic switch are physically coupled around the battery to contact both a positive terminal and a negative terminal of the battery; and the flexible circuit board includes: a first contact pad; a second contact pad; and a flexible ribbon physically coupled between the first contact pad and the second contact pad. In several embodiments, installing the battery and the first electronic device, in combination, into the second electronic device further includes: physically contacting the positive terminal of the battery with a first conductive region of the first contact pad. In several embodiments, installing the battery and the first electronic device, in combination, into the second electronic device further includes: physically contacting a positive terminal of the second electronic device with a second conductive region of the first contact pad. In several embodiments, installing the battery and the first electronic device, in combination, into the second electronic device further includes: physically contacting the negative terminal of the battery with a second conductive region of the second contact pad. In several embodiments, installing the battery and the first electronic device, in combination, into the second electronic device further includes: physically contacting a negative terminal of the second electronic device with a third conductive region of the second contact pad. In several embodiments, the electronic switch is electrically coupled between the second conductive region and the third conductive region.

An apparatus has also been disclosed according to one or more embodiments of the present disclosure. The apparatus generally includes: a first electronic device adapted to be installed, together with a battery, into a second electronic device, wherein the first electronic device includes: a sensor; an electronic switch; and a microcontroller electrically coupled to the sensor and the electronic switch; and wherein the first electronic device is configured so that, when the first electronic device is installed, together with the battery, into the second electronic device: the microcontroller is electrically coupled to the battery; the electronic switch is electrically coupled between the battery and the second electronic device; and the first electronic device is actuable between: a first configuration, in which the electronic switch allows electrical power to be supplied between the battery and the second electronic device; and a second configuration, in which the electronic switch prevents electrical power from being supplied between the battery and the second electronic device. In several embodiments, the first electronic device is configured so that, when the first electronic device is installed, together with the battery, into the second electronic device: the sensor detects a physical state of the second electronic device; and based on the detected physical state of the second electronic device, the sensor sends one or more first electrical signals to the microcontroller. In several embodiments, the first electronic device is configured so that, when the first electronic device is installed, together with the battery, into the second electronic device: the microcontroller receives the one or more first electrical signals sent from the sensor; and based on such received one or more first electrical signals, the microcontroller sends one or more second electrical signals to the electronic switch. In several embodiments, the first electronic device is configured so that, when the first electronic device is installed, together with the battery, into the second electronic device: the electronic switch receives the one or more second electrical signals sent from the microcontroller; and based on such received one or more second electrical signals, the electronic switch actuates the first electronic device between the first configuration and the second configuration. In several embodiments, the first electronic device further includes a flexible circuit board to which the microcontroller, the sensor, and the electronic switch are physically coupled; the first electronic device is configured so that, when the first electronic device is installed, together with the battery, into the second electronic device: the flexible circuit board wraps around the battery to contact both a positive terminal and a negative terminal of the battery; and the flexible circuit board includes: a first contact pad; a second contact pad; and a flexible ribbon physically coupled between the first contact pad and the second contact pad. In several embodiments, the first contact pad includes a first conductive region; and the first electronic device is configured so that, when the first electronic device is installed, together with the battery, into the second electronic device: the first conductive region physically contacts the positive terminal of the battery. In several embodiments, the first contact pad further includes a second conductive region; and the first electronic device is configured so that, when the first electronic device is installed, together with the battery, into the second electronic device: the second conductive region physically contacts a positive terminal of the second electronic device. In several embodiments, the second contact pad includes a second conductive region; and the first electronic device is configured so that, when the first electronic device is installed, together with the battery, into the second electronic device: the second conductive region physically contacts the negative terminal of the battery. In several embodiments, the second contact pad further includes a third conductive region; and the first electronic device is configured so that, when the first electronic device is installed, together with the battery, into the second electronic device: the third conductive region physically contacts a negative terminal of the second electronic device. In several embodiments, the electronic switch is electrically coupled between the second conductive region and the third conductive region. In several embodiments, the apparatus further includes the battery and the second electronic device; wherein the first electronic device is installed, together with the battery, into the second electronic device; wherein the microcontroller is electrically coupled to the battery; wherein the electronic switch is electrically coupled between the battery and the second electronic device; wherein the first electronic device is actuable between: a first configuration, in which the electronic switch allows electrical power to be supplied via the electronic switch between the battery and the second electronic device; and a second configuration, in which the electronic switch prevents electrical power from being supplied via the electronic switch between the battery and the second electronic device; wherein the first electronic device further includes a flexible circuit board to which the microcontroller, the sensor, and the electronic switch are physically coupled; wherein the sensor is an accelerometer; wherein the flexible circuit board wraps around the battery to contact both a positive terminal and a negative terminal of the battery; wherein the flexible circuit board includes: a first contact pad; a second contact pad; and a flexible ribbon physically coupled between the first contact pad and the second contact pad; wherein the first contact pad includes a first conductive region; wherein the first conductive region physically contacts the positive terminal of the battery; wherein the second contact pad includes a second conductive region; wherein the second conductive region physically contacts the negative terminal of the battery; wherein the second contact pad further includes a third conductive region; wherein the third conductive region physically contacts a negative terminal of the second electronic device; wherein the electronic switch is electrically coupled between the second conductive region and the third conductive region; and wherein the second electronic device is a keyless fob.

Another apparatus has also been disclosed according to one or more embodiments of the present disclosure. The another apparatus generally includes: a sensor; an electronic switch; a microcontroller electrically coupled to the sensor and the electronic switch; and a flexible circuit board to which the microcontroller, the sensor, and the electronic switch are physically coupled, wherein the flexible circuit board includes: a first contact pad; a second contact pad, including: a first conductive region adapted to physically contact a first terminal; and a second conductive region adapted to physically contact a second terminal; and a flexible ribbon physically coupled between the first contact pad and the second contact pad; wherein the electronic switch is electrically coupled between the first conductive region and the second conductive region. In several embodiments, the first contact pad includes a third conductive region adapted to physically contact a positive terminal of a battery. In several embodiments, the first contact pad further includes a fourth conductive region adapted to physically contact a positive terminal of a keyless fob. In several embodiments, the first terminal is a negative terminal of the battery; and the second terminal is a negative terminal of a keyless fob. In several embodiments, when the first conductive region physically contacts the negative terminal of the battery, the second conductive region physically contacts the negative terminal of the keyless fob, and the third conductive region physically contacts the positive terminal of the battery: the microcontroller is electrically coupled to the battery; the electronic switch is electrically coupled between the battery and the keyless fob; and the another apparatus is actuable between: a first configuration, in which the electronic switch allows electrical power to be supplied between the battery and the keyless fob; and a second configuration, in which the electronic switch prevents electrical power from being supplied between the battery and the keyless fob. In several embodiments, the another apparatus further includes the battery; wherein the first conductive region physically contacts the negative terminal of the battery; wherein the third conductive region physically contacts the positive terminal of the battery; wherein the flexible circuit board is wrapped around the battery; and wherein the microcontroller is electrically coupled to the battery. In several embodiments, the another apparatus further includes the keyless fob; wherein the second conductive region physically contacts the negative terminal of the keyless fob; wherein the electronic switch is electrically coupled between the battery and the keyless fob; and wherein the another apparatus is actuable between: a first configuration, in which the electronic switch allows electrical power to be supplied between the battery and the keyless fob; and a second configuration, in which the electronic switch prevents electrical power from being supplied between the battery and the keyless fob.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method, comprising:
   installing a battery and a first electronic device, in combination, into a second electronic device,
   wherein the first electronic device comprises:
      a sensor;
      an electronic switch;
      a microcontroller electrically coupled to the sensor and the electronic switch; and
      a flexible circuit board;
         wherein the sensor, the electronic switch, and the microcontroller are electrically coupled to the flexible circuit board;
   and
   wherein installing the battery and the first electronic device, in combination, into the second electronic device electrically couples:
      the microcontroller to the battery via the flexible circuit board; and
      the electronic switch between the battery and the second electronic device via the flexible circuit board;
   actuating the first electronic device between:
      a first configuration, in which the electronic switch allows electrical power to be supplied between the battery and the second electronic device; and a second configuration, in which the electronic switch prevents electrical power from being supplied between the battery and the second electronic device.

2. The method of claim 1, wherein actuating the first electronic device between the first configuration and the second configuration comprises:
   detecting, using the sensor, a physical state of the second electronic device; and
   based on the detected physical state of the second electronic device, sending, using the sensor, one or more first electrical signals to the microcontroller.

3. The method of claim 2, wherein actuating the first electronic device between the first configuration and the second configuration further comprises:
   receiving, using the microcontroller, the one or more first electrical signals sent from the sensor; and
   based on such received one or more first electrical signals, sending, using the microcontroller, one or more second electrical signals to the electronic switch.

4. The method of claim 3, wherein actuating the first electronic device between the first configuration and the second configuration further comprises:
   receiving, using the electronic switch, the one or more second electrical signals sent from the microcontroller; and
   based on such received one or more second electrical signals, actuating the first electronic device between the first configuration and the second configuration.

5. A method, comprising:
   installing a battery and a first electronic device, in combination, into a second electronic device,
      wherein the first electronic device comprises:
         a sensor;
         an electronic switch; and
         a microcontroller electrically coupled to the sensor and the electronic switch;
      wherein installing the battery and the first electronic device, in combination, into the second electronic device comprises:
         wrapping a flexible circuit board to which the microcontroller, the sensor, and the electronic switch are physically coupled around the battery to contact both a positive terminal and a negative terminal of the battery;
      wherein the flexible circuit board comprises:
         a first contact pad;
         a second contact pad; and
         a flexible ribbon physically coupled between the first contact pad and the second contact pad;
      and
      wherein installing the battery and the first electronic device, in combination, into the second electronic device electrically couples:
         the microcontroller to the battery; and
         the electronic switch between the battery and the second electronic device;
   actuating the first electronic device between:
      a first configuration, in which the electronic switch allows electrical power to be supplied between the battery and the second electronic device; and
      a second configuration, in which the electronic switch prevents electrical power from being supplied between the battery and the second electronic device.

6. The method of claim 5, wherein installing the battery and the first electronic device, in combination, into the second electronic device further comprises:
   physically contacting the positive terminal of the battery with a first conductive region of the first contact pad.

7. The method of claim 6, wherein installing the battery and the first electronic device, in combination, into the second electronic device further comprises:
   physically contacting a positive terminal of the second electronic device with a second conductive region of the first contact pad.

8. The method of claim 6, wherein installing the battery and the first electronic device, in combination, into the second electronic device further comprises:
   physically contacting the negative terminal of the battery with a second conductive region of the second contact pad.

9. The method of claim 8, wherein installing the battery and the first electronic device, in combination, into the second electronic device further comprises:
   physically contacting a negative terminal of the second electronic device with a third conductive region of the second contact pad.

10. The method of claim 9, wherein the electronic switch is electrically coupled between the second conductive region and the third conductive region.

11. An apparatus, comprising:
   a first electronic device adapted to be installed, together with a battery, into a second electronic device,
      wherein the first electronic device comprises:
         a sensor;
         an electronic switch;
         a microcontroller electrically coupled to the sensor and the electronic switch; and
         a flexible circuit board;
            wherein the sensor, the electronic switch, and the microcontroller are electrically coupled to the flexible circuit board;
      and
      wherein the first electronic device is configured so that, when the first electronic device is installed, together with the battery, into the second electronic device:
         the microcontroller is electrically coupled to the battery via the flexible circuit board;
         the electronic switch is electrically coupled between the battery and the second electronic device via the flexible circuit board; and
         the first electronic device is actuable between:
            a first configuration, in which the electronic switch allows electrical power to be supplied between the battery and the second electronic device; and
            a second configuration, in which the electronic switch prevents electrical power from being supplied between the battery and the second electronic device.

12. The apparatus of claim 11, wherein the first electronic device is configured so that, when the first electronic device is installed, together with the battery, into the second electronic device:
   the sensor detects a physical state of the second electronic device; and
   based on the detected physical state of the second electronic device, the sensor sends one or more first electrical signals to the microcontroller.

13. The apparatus of claim 12, wherein the first electronic device is configured so that, when the first electronic device is installed, together with the battery, into the second electronic device:

the microcontroller receives the one or more first electrical signals sent from the sensor; and based on such received one or more first electrical signals, the microcontroller sends one or more second electrical signals to the electronic switch.

14. The apparatus of claim 13, wherein the first electronic device is configured so that, when the first electronic device is installed, together with the battery, into the second electronic device:

the electronic switch receives the one or more second electrical signals sent from the microcontroller; and based on such received one or more second electrical signals, the electronic switch actuates the first electronic device between the first configuration and the second configuration.

15. An apparatus, comprising:

a first electronic device adapted to be installed, together with a battery, into a second electronic device, wherein the first electronic device comprises:
  a sensor;
  an electronic switch;
  a microcontroller electrically coupled to the sensor and the electronic switch; and
  a flexible circuit board to which the microcontroller, the sensor, and the electronic switch are physically coupled;
    wherein the first electronic device is configured so that, when the first electronic device is installed, together with the battery, into the second electronic device:
      the flexible circuit board wraps around the battery to contact both a positive terminal and a negative terminal of the battery;
    and
    wherein the flexible circuit board comprises:
      a first contact pad;
      a second contact pad; and
      a flexible ribbon physically coupled between the first contact pad and the second contact pad;

and wherein the first electronic device is configured so that, when the first electronic device is installed, together with the battery, into the second electronic device:
  the microcontroller is electrically coupled to the battery;
  the electronic switch is electrically coupled between the battery and the second electronic device; and
  the first electronic device is actuable between:
    a first configuration, in which the electronic switch allows electrical power to be supplied between the battery and the second electronic device; and
    a second configuration, in which the electronic switch prevents electrical power from being supplied between the battery and the second electronic device.

16. The apparatus of claim 15, wherein the first contact pad comprises a first conductive region; and wherein the first electronic device is configured so that, when the first electronic device is installed, together with the battery, into the second electronic device:
  the first conductive region physically contacts the positive terminal of the battery.

17. The apparatus of claim 16, wherein the first contact pad further comprises a second conductive region; and wherein the first electronic device is configured so that, when the first electronic device is installed, together with the battery, into the second electronic device:
  the second conductive region physically contacts a positive terminal of the second electronic device.

18. The apparatus of claim 16, wherein the second contact pad comprises a second conductive region; and wherein the first electronic device is configured so that, when the first electronic device is installed, together with the battery, into the second electronic device:
  the second conductive region physically contacts the negative terminal of the battery.

19. The apparatus of claim 18, wherein the second contact pad further comprises a third conductive region; and wherein the first electronic device is configured so that, when the first electronic device is installed, together with the battery, into the second electronic device:
  the third conductive region physically contacts a negative terminal of the second electronic device.

20. The apparatus of claim 19, wherein the electronic switch is electrically coupled between the second conductive region and the third conductive region.

21. An apparatus, comprising:

a first electronic device adapted to be installed, together with a battery, into a second electronic device, wherein the first electronic device comprises:
  a sensor;
  an electronic switch; and
  a microcontroller electrically coupled to the sensor and the electronic switch;

wherein the first electronic device is configured so that, when the first electronic device is installed, together with the battery, into the second electronic device:
  the microcontroller is electrically coupled to the battery;
  the electronic switch is electrically coupled between the battery and the second electronic device; and
  the first electronic device is actuable between:
    a first configuration, in which the electronic switch allows electrical power to be supplied between the battery and the second electronic device; and
    a second configuration, in which the electronic switch prevents electrical power from being supplied between the battery and the second electronic device;

the battery; and the second electronic device;

wherein the first electronic device is installed, together with the battery, into the second electronic device;

wherein the microcontroller is electrically coupled to the battery;

wherein the electronic switch is electrically coupled between the battery and the second electronic device;

wherein the first electronic device is actuable between:
  a first configuration, in which the electronic switch allows electrical power to be supplied via the electronic switch between the battery and the second electronic device; and
  a second configuration, in which the electronic switch prevents electrical power from being supplied via the electronic switch between the battery and the second electronic device;

wherein the first electronic device further comprises a flexible circuit board to which the microcontroller, the sensor, and the electronic switch are physically coupled;

wherein the sensor is an accelerometer;
wherein the flexible circuit board wraps around the battery to contact both a positive terminal and a negative terminal of the battery;
wherein the flexible circuit board comprises:
- a first contact pad;
- a second contact pad; and
- a flexible ribbon physically coupled between the first contact pad and the second contact pad;

wherein the first contact pad comprises a first conductive region;
wherein the first conductive region physically contacts the positive terminal of the battery;
wherein the second contact pad comprises a second conductive region;
wherein the second conductive region physically contacts the negative terminal of the battery;
wherein the second contact pad further comprises a third conductive region;
wherein the third conductive region physically contacts a negative terminal of the second electronic device;
wherein the electronic switch is electrically coupled between the second conductive region and the third conductive region; and
wherein the second electronic device is a keyless fob.

22. The apparatus of claim 11, further comprising the battery and the second electronic device.

23. The apparatus of claim 15, further comprising the battery and the second electronic device.

* * * * *